United States Patent [19]
Meijer

[11] Patent Number: 5,477,668
[45] Date of Patent: Dec. 26, 1995

[54] MOBILE BALE COLLECTOR

[76] Inventor: Thomas H. D. Meijer, Stadsweg 123, 9792 RE, Ten Post, Netherlands

[21] Appl. No.: 232,986

[22] Filed: Apr. 22, 1994

[30] Foreign Application Priority Data

Apr. 26, 1993 [NL] Netherlands ............................ 9300711

[51] Int. Cl.⁶ .......................... A01D 75/04; B65G 57/08; B65G 57/32
[52] U.S. Cl. .......................... 56/474; 56/475; 414/789.7; 414/791.3
[58] Field of Search ............................ 56/343, 474, 475, 56/479; 414/24.5, 502, 539, 789.7, 791.3

[56] References Cited

U.S. PATENT DOCUMENTS

| 2,702,131 | 2/1955 | Leupke .................................. 56/475 X |
| 3,436,903 | 4/1969 | Blair .................................. 414/789.7 X |
| 5,046,918 | 9/1991 | Berlivet et al. ....................... 414/789.7 |

FOREIGN PATENT DOCUMENTS

| 654693 | 12/1962 | Canada ............................... 414/789.7 |
| 0108277 | 5/1984 | European Pat. Off. . |
| 1263664 | 5/1961 | France . |
| 3737969 | 5/1989 | Germany . |
| 2000723 | 1/1979 | United Kingdom ................ 414/789.7 |
| 2212100 | 7/1989 | United Kingdom . |

Primary Examiner—David J. Bagnell
Attorney, Agent, or Firm—Deveau, Colton & Marquis

[57] ABSTRACT

A mobile bale collector having a frame, bale carrier, and a coupling for connecting the bale collector to a mobile bale collector to receive bales from the baler, and the carrier is coupled to the frame by a hinge. In operation, a first bale is received onto the bale collector and moved rearward until the bale contacts a blocking device at the rear end of the bale carder. The blocking device is locked in position during the collection stage. The hinge coupling the carder to the frame permits the carder to pivot downwardly, to a low position after the first bale has been received. The carder may then receive a second bale from the baler. The second bale is propelled along the top surface of the first bale, toward the rear of the carrier. As the second bale moves into position, aligned over the first bale, the second bale releases the blocking device, thereby allowing the stacked bales to unload from the rear of the carder onto the ground in a stacked orientation. Once the bales have been unloaded from the collector, the carder springs upwardly about its hinge, into its upper position, to begin the next loading cycle by receiving a first bale from the baler.

9 Claims, 3 Drawing Sheets

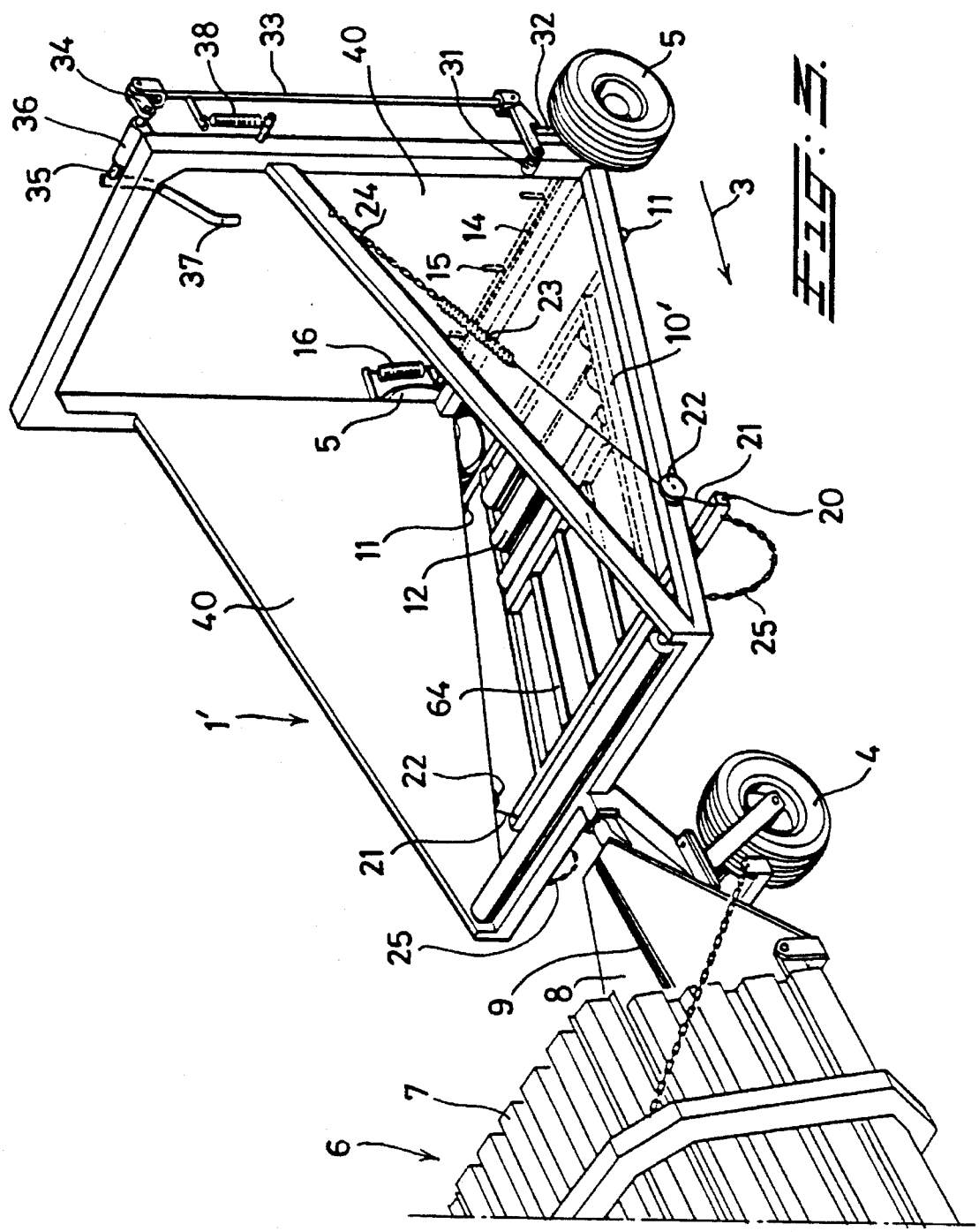

MOBILE BALE COLLECTOR

BACKGROUND OF THE INVENTION

The invention relates to a bale collector, comprising a frame provided with wheels, bale-carrying means, coupling means which are suitable for coupling the frame to a mobile baler in order to receive essentially block-shaped bales onto the carrying means from a bale outlet of the baler via a front end—viewed in the direction of travel—of the carrying means, blocking means at a rear end of the carrying means, and locking means, in such a way that in a collecting state the blocking means collect and retain a number of bales on the carrying means, and in an unloading state the locking means release the blocking means in order to allow through and deposit on the ground bales collected on the carrying means.

A bale collector of the abovementioned type is known in practice. The known bale collector is not suitable for stacking bales, and the known bale collector is not safe to use if the baler has a relatively low bale outlet, in view of possible obstacles on the road obstacles on the road or the ground over which the collector is travelling. Besides, the carrying means of the known bale collector have an essentially horizontal, flat bottom, on which bales being pushed along encounter relatively great friction, so that the pushing of following bales causes a counterpressure towards the press, with the result that the bales are unintentionally pressed more tightly, and damage may even occur to the baler. These shortcomings are found particularly in the case of relatively heavy bales, for example silage bales predried grass, which are generally 1.6 m long, 1.2 m wide and 0.7 m high, and can weigh 500 to 800 kg. The friction forces occurring between such bales and the flat bottom can be considerable. Furthermore, if such bales were to be dropped onto a low flat bottom of the collector, with a view to other bales being slid over them there at a later stage, there is a risk of the bottom bales tilting, or even turning over completely, when they are being deposited on the bottom, which could impede a further supply of bales onto the collector.

SUMMARY OF THE INVENTION

The object of the invention is to eliminate the shortcomings of the known bale collector.

To this end, the bale collector of the type mentioned in the preamble according to the invention is characterized in that the carrying means are coupled to the frame by means of first hinge means which are disposed between the frame and the rear end of the carrying means, the first hinge means having an axis of rotation extending horizontally and at right angles to the direction of travel, in that between the frame and the carrying means there are disposed lifting means which exert such a force on the carrying means that the front end of the carrying means is in a high position while receiving a bottom bale, and the front end is subsequently in a low position in order to receive a top bale onto the bottom bale. This means that two bales can be stacked on top of each other on the carrying means even if the baler has a relatively low bale outlet. If the front end of the carrying means encounters an obstacle, for example a bump in the ground, while travelling, the front end can easily flip up, and the carrying means can be drawn over the obstacle. Since the carrying means initially form a slanting bearing face while receiving the bottom bale, said bale encounters relatively little resistance, and the occurrence of counterpressure towards the baler and the harmful consequences thereof are prevented. The carrying means could therefore have a flat bottom, in particular in the case of relatively light bales, for example straw. When the top bale is pushed over the bottom bale, the friction between them is already relatively low, as is generally known.

The carrying means preferably have one or more rollers, the axes of rotation of which extend horizontally and at right angles to the direction of travel. This means that the friction between the carrying means and the bottom bale is reduced further, so that both during collection and during unloading the occurrence of counterpressure towards the baler and the harmful consequences thereof are further counteracted. This embodiment is particularly advantageous if the baler has a low bale outlet.

The collector is preferably characterized in that in the low position of the front end of the carrying means the height thereof is such that a bale currently being delivered by the baler encounters a top part of the bottom bale on the carrying means and, if the top bale has not yet been collected on the carrying means, the bale currently being delivered flips up over the bottom bale which it has encountered. This prevents a situation where during unloading the collected top bale is pushed over the bottom bale and deposited on the ground and, as a result of the greater friction with the carrying means the bottom bale is left behind on the carrying means. This measure also has the advantage that the two bales of each stack deposited on the ground remain vertically aligned relative to each other.

In the case of the known bale collector the coupling means fix the collector rigidly to the baler, and the wheels of the collector are swivelling wheels. This limits the maneuverability of the combination of collector and baler. In order to eliminate this shortcoming, the invention also relates to a mobile baler having, viewed in the direction of travel, at the rear a bale outlet and behind a bale outlet coupling means for coupling to coupling means of a bale collector, characterized in that the coupling means are rotatable coupling means with an essentially vertical axis of rotation, and behind the bale outlet a supply plate halving in the centre thereof an elongated guide element disposed upright on the plate, essentially parallel to the direction of travel of the baler, for the purpose of guiding over it the bales coming out of the bale outlet. The guide element continues to guide bales delivered by the baler while the combination of baler and collector are passing through a bend, which is advantageous for good functioning of the combination.

BRIEF DESCRIPTION OF PREFERRED EMBODIMENTS

Other features and advantages of the bale collector according to the invention will emerge from the following explanation of an embodiment of the bale collector with reference to the appended drawings, in which:

FIG. 3 shows in perspective another embodiment of a bale collector according to the invention, coupled behind a partially shown bailer.

DETAILED DESCRIPTION OF PREFERRED EMBODIMENTS

Figure 1:
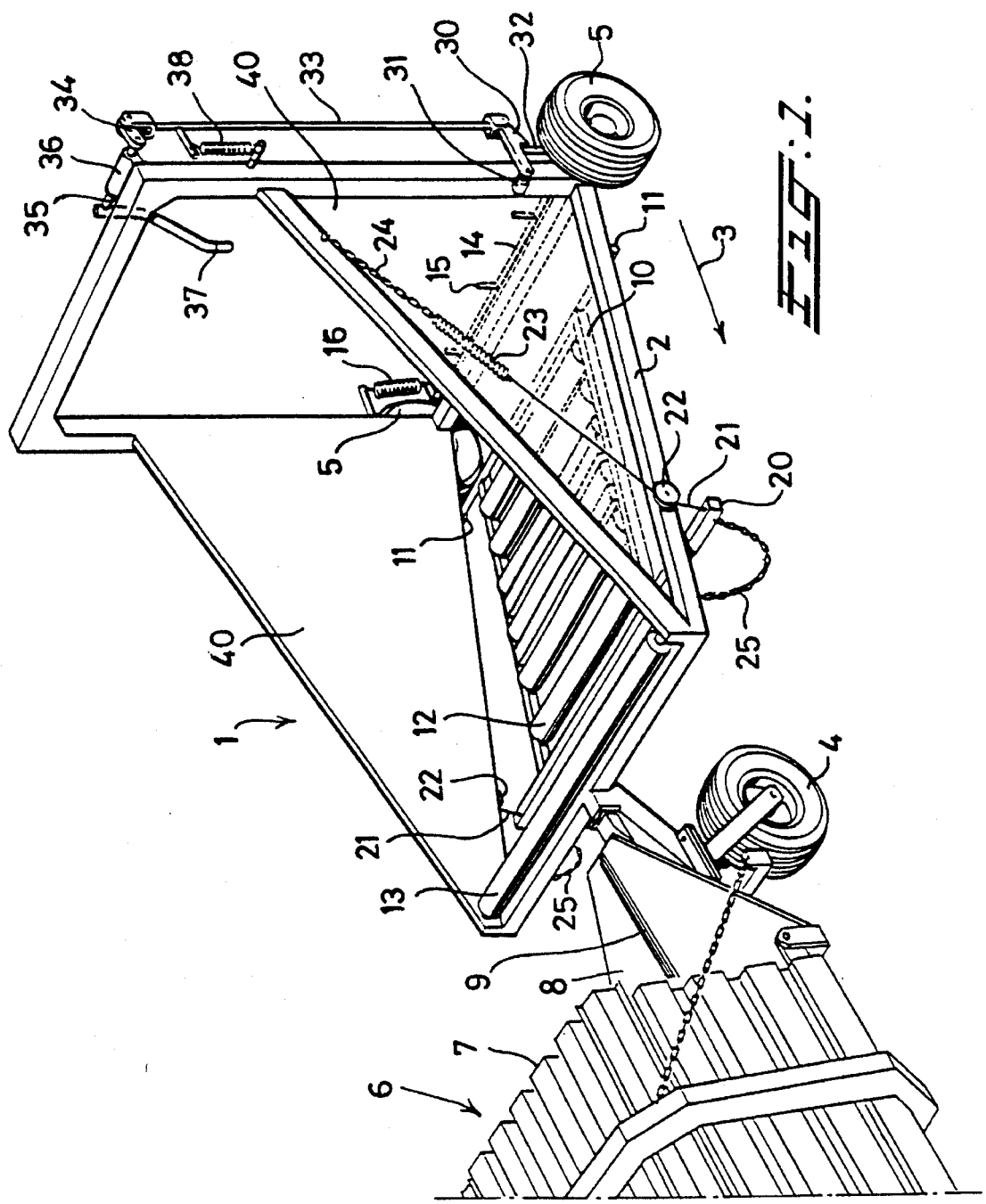
FIG. 1 shows in perspective a bale collector according to the invention, coupled behind a partially shown baler.

The bale collector 1 shown in perspective in FIG. 1 according to the invention comprises a frame 2, on which a swivelling wheel 4 is provided at a front end, viewed in a direction of travel indicated by the arrow 3, and on which wheels 5 are provided at a rear end.

At the front end of the frame 2, provision is also made for coupling means (not shown) which are known per se, by means of which the collector 1 is coupled to a rear end of a baler 6. The coupling means are rotary coupling means with an essentially vertical axis of rotation which allow the collector 1 to rotate about the axis of rotation relative to the baler 6, which is advantageous for good maneuverability of the combination of collector 1 and baler 6. The baler 6 has a bale outlet 7 with a supporting plate 8 which has in the centre thereof a raised edge 9 running in the lengthwise direction of the bale outlet 7, and intended for keeping bales delivered by the baler 6 running in that direction when the baler 6 rotates relative to the bale collector 1 about the essentially vertical axis of the coupling means.

The bale collector 1 has carrying means which, as shown, preferably consist of a roller track 10, which at the rear end thereof is rotatably coupled to the frame 2 by means of hinge means or bearings 11. The roller track 10 has a number of parallel rollers, such as the roller 12. At the front end of the collector 1, a roller 13 is coupled to the frame 2. At the rear, end of the collector 1, blocking means are disposed on the frame 2, which blocking means consist of a horizontal shaft 14 and retaining elements fixed at right angles thereto, such as the element 15, which in the illustrated position of the collector 1 are intended for retaining a bottom bale resting against the elements 15. The shaft 14 is coupled to the frame 2 by means of other hinge means (not shown). All axes of rotation of the hinge means 11 and of the hinge means for the shaft 14 and of the rollers 12, 13 extend horizontally and at right angles to the direction of travel 3. The blocking means also comprise a tension spring 16 which is fixed between the shaft 14 and the frame 2 and forces the blocking means into the position shown in FIG. 1.

A bar 20 is fixed at the front end of the roller track 10. A wire 21 is fixed to one end of the bar 20 at each side of the collector 1. The wire 21 runs above the bar 20 over a pulley 22 fixed to the frame 2 and is fixed to the frame 2 by means of a tension spring 23 and a chain 24 at the rear end of the collector 1. The length of chain 24 can be altered by means of suitable hooks (not shown), with the result that the pulling force exerted on the bar 20 by the spring 23 can be adjusted.

FIG. 1 shows the carrying means, in particular the roller track 10, with the front end thereof in a high position. This position is very suitable for receiving a bottom bale (50a in FIG. 2) on the roller track 10. The bottom bale is subject to little friction from the rollers 12 in this case, and can consequently be pushed up by the following bales coming out of the bale outlet 7. Depending on the pulling force which has been set for the lifting means 20 to 24, the roller track will drop at a given moment through the weight of the bale collected thereon until the front end of the roller track 10 is in a low position. A chain 25 fixed at each side of the collector 1 to the end of the corresponding bar 20 limits the height to which the front end of the roller track 10 can drop, and thereby determines the height of the low position of the front end of the roller track 10. The length of each chain 25 can be altered by means of suitable hooks (not shown), depending on the height of the bales to be collected.

The blocking means 14, 15 are held in the position shown in FIG. 1 by locking means which consist of a hook 30 which is fixed to the frame 2, and one end of which has a shaft which is parallel to the other shafts and is rotatable in a bearing 31 fixed to the frame 2. In the locked position, the hook 30 engages over a retaining element 32 fixed to the shaft 14 of the locking means. Another end of the hook 30 is rotatably coupled by means of a rod 33 to an arm 34, of which a shaft 35 running parallel to the other shafts runs through a bearing 36. A control arm 37 is connected at one end of the shaft 35. The control arm 37 is such that when the top bale (50b in FIG. 2) knocks against the control arm 37 the hook 30 comes away from the retaining element 32, with the result that the shaft 14 will rotate (clockwise in FIG. 1), causing the retaining elements 15 to swing down so that they can allow to pass the stacked bales (50a and 50b in FIG. 2) collected on the roller track 10. After the passage of the stack of bales, the blocking means 14, 15 are retracted by the spring 16, and the locking means are retracted into the locking position by a spring 38 fixed between the rod 33 and the frame 2.

The collector 1 preferably also has on each side a vertical plate 40 for guiding the bales, in particular the bottom bale.

Figure 2:
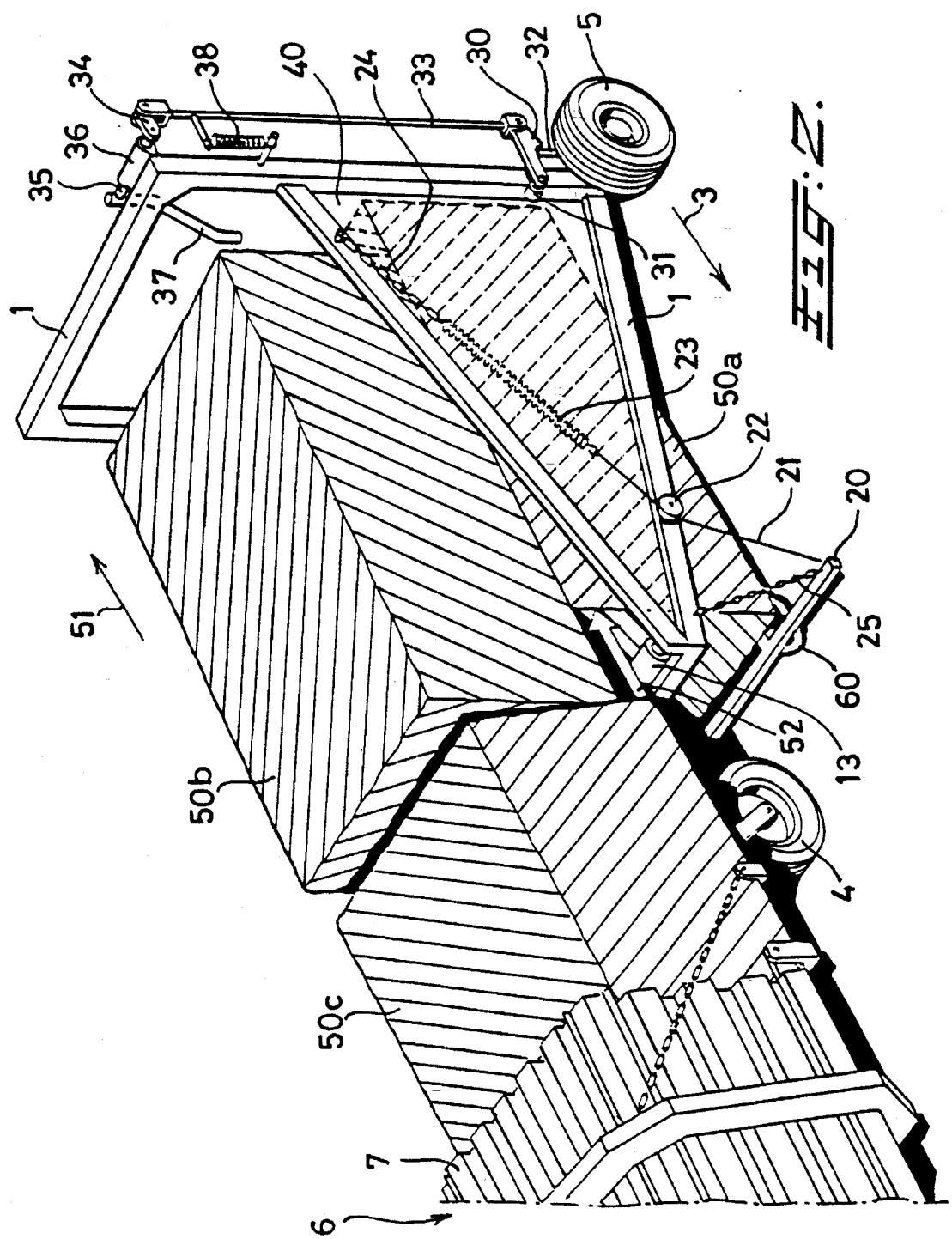
FIG. 2 shows in perspective the bale collector of FIG. 1 with bales thereon.

In the situation shown in FIG. 2, a bottom or first bale 50a is situated on the roller track 10, and on top of that is a top or second bale 50b, which is pushed in the direction indicated by the arrow 51 by a third bale 50c currently being delivered through the bale outlet 7 of the baler 6.

As the second bale 50b reaches the rear end of the collector 1, it will knock against the control arm 37 and move it backwards, until the hook 30 is ultimately released from the retaining element 32, with the result that the shaft 14 will rotate and the retaining elements 15 will fold down, so that the stack of bales 50a, 50b on the roller track 10 is pushed off the roller track 10 by the third bale 50c and deposited on the ground.

The length of each chain 25, and thereby the low position of the roller track 10, is preferably adjusted in such a way that when the bottom, first bale 50a is collected on the roller track 10 each following bale 50b, 50c will knock against the top of the bottom bale 50a, as indicated by the arrow 52. The adjustment is also such that when the top, second bale 50b knocks against the earlier collected bottom, first bale 50a, the top bale 50b touches the bottom bale 50a only over such a small height that the top bale 50b, as a result of the resilient compressibility of the bales, can flip up over the top, front end of the bottom bale 50a and can slide further over the bottom bale 50a. This ensures that when the top bale 50b unlocks the locking means 30–37 thee top bale 50b is not the only one which is pushed off the collector 1 by the following, third bale 50c.

A skate, for example a bracket 60, is preferably disposed on each side of the collector 1 underneath and on the carrying means 10, 20, by means of which bracket the carrying means 10, 20 are more easily guided over bumps in the ground.

The bale collector 1 is suitable in particular for the collection of the large bales now commonly used, also known as big-bales. Such silage bales can have dimensions of 1.6 m long, 1.2 m wide and 0.7 m high, and can be a weight of 500–800 kg. Such bales are often delivered by balers 6 with a relatively low bale outlet 7, and until now it was not possible to stack rows of such bales on a collector. The invention now makes this possible. In view of the generally low bale outlet 7 in such balers 6, the rear wheels 5 of the collector 1 are preferably disposed on either side of the carrying means 10, 20, with the result that the height of the carrying means 10, 20 can be low relative to the ground.

Although the advantages of the bale collector according to the invention are described above for use for bales of silage in particular, the bale collector according to the invention can also be used for collecting, for example, bales of straw which can be 2.4 m long, 1.2 m wide, and 0.7 m high and can be a weight of 300 kg. Since such bales produce lower friction forces and, due to their greater length, undesirable tilting of such bales during their movement onto the carrying means is less likely to occur, the carrying means can even have a flat bottom, or the roller track 10 used as the carrying means can be designed with fewer rollers.

FIG. 3 shows an embodiment of a collector 1' according to the invention, which differs from the collector 1 shown in FIG. 1 by that the front part of the roller track 10' of the collector 1', instead of rollers, has guide bars or guide pipes, such as 64, extending parallel to the direction of travel 3.

What is claimed is:

1. Bale collector comprising a frame provided with wheels, a bale-carrying means, coupling means which are suitable for coupling the frame to a mobile baler in order to receive essentially block-shaped bales onto the carrying means from a bale outlet of the baler via a front end, viewed in the direction of travel, of the carrying means, blocking means at a rear end of the carrying means, and locking means, in such a way that in a collecting state the blocking means collect and retain a number of bales on the carrying means, and in an unloading state the locking means release the blocking means in order to allow through and deposit on the ground bales collected on the carrying means, the carrying means are coupled to the frame by means of first hinge means which are disposed between the frame and the rear end of the carrying means, the first hinge means having an axis of rotation extending horizontally and at right angles to the direction of travel, between the frame and the carrying means there are disposed lifting means which exert such a force on the carrying means that the front end of the carrying means is in a high position while receiving a bottom bale, and the front end is subsequently in a low position for receiving a top bale onto the bottom bale.

2. Bale collector according to claim 1, wherein the carrying means have one or more rollers, the axes of rotation of which extend horizontally and at right angles to the direction of travel.

3. Bale collector according to claim 1 or 2, wherein a roller is disposed on the frame at the front end of the carrying means, which roller has an axis of rotation which extends horizontally and at right angles to the direction of travel, and the highest level of which roller is at or above the front end of the carrying means in their high position.

4. Bale collector according to claim 1, wherein in the low position of the front end of the carrying means the height thereof is such that a bale currently being delivered by the baler knocks against a top part of the bottom bale on the carrying means, and if the top bale has not yet been collected on the carrying means, the bale currently being delivered flips up over the bottom bale which it has encountered.

5. Bale collector according to claim 4, wherein adjusting means are provided on the carrying means, for the purpose of adjusting the low position of the front end of the carrying means.

6. Bale collector according to claim 1, wherein the blocking means are provided only opposite the bottom bale, the blocking means are coupled to the frame by means of second hinge means disposed at or below the height of the rear end of the carrying means, and the second hinge means have an axis of rotation extending horizontally and at right angles to the direction of travel.

7. Bale collector according to claim 1, wherein in an area above the rear end of the carrying means the locking means comprise an end sensor, which is intended, after operation thereof by the rear top bale, to make the blocking means initiate the unloading state.

8. Bale collector according to claim 1, wherein said wheels are behind the coupling means and disposed on either side of the carrying means.

9. Bale collector according to claim 1, further comprising skate means disposed below and on the from end of the carrying means.

* * * * *